United States Patent [19]

Suzuki et al.

[11] Patent Number: 5,700,224
[45] Date of Patent: Dec. 23, 1997

[54] CVT CONTROL SYSTEM FOR VEHICLE DRIVETRAIN

[75] Inventors: Akito Suzuki; Tatsuo Ochiai, both of Fujisawa, Japan

[73] Assignee: Nissan Motor Co., Ltd., Yokohama, Japan

[21] Appl. No.: 594,992

[22] Filed: Jan. 31, 1996

[30] Foreign Application Priority Data

Feb. 1, 1995 [JP] Japan .................................. 7-014969

[51] Int. Cl.$^6$ .......................................... B60K 41/04
[52] U.S. Cl. ............................. 477/45; 477/44
[58] Field of Search ........................ 477/40, 44, 45, 477/46, 92

[56] References Cited

U.S. PATENT DOCUMENTS

| | | | |
|---|---|---|---|
| 4,833,944 | 5/1989 | Tanaka | 477/46 X |
| 5,012,696 | 5/1991 | Miyawaki | 477/45 |
| 5,022,285 | 6/1991 | Suzuki | 477/40 |
| 5,050,455 | 9/1991 | Yamashita et al. | 477/46 |
| 5,062,050 | 10/1991 | Petzold et al. | 477/45 X |
| 5,113,718 | 5/1992 | Sato | 477/40 |
| 5,211,083 | 5/1993 | Hattori et al. | 477/45 X |
| 5,527,231 | 6/1996 | Seidel et al. | 477/46 |

*Primary Examiner*—Charles A. Marmor
*Assistant Examiner*—Peter T. Kwon
*Attorney, Agent, or Firm*—Foley & Lardner

[57] ABSTRACT

A CVT control system for a vehicle drivetrain controls line pressure applied to an output pulley of the CVT to different levels against various CVT ratios in response to operator brake command, causing the output pulley to create force to hold the V-belt.

12 Claims, 7 Drawing Sheets

CVT CONTROL SYSTEM FOR VEHICLE DRIVETRAIN

BACKGROUND OF THE INVENTION

The present invention relates to a continuously variable transmission (CVT) control system for a vehicle drivetrain.

Continuously variable transmissions (CVT's) are transmissions that change ratio continuously, not in discrete intervals. Among various CVT's, the present invention is operable with a CVT with pulley and belt power transfer. This transmission includes an input pulley, an output pulley and a power transmission belt drivingly interconnecting the input and output pulleys.

What is desirable in holding the belt is independent control of line hydraulic fluid pressure applied to the output pulley from control of ratio control hydraulic fluid pressure applied to the input pulley. Independent control of the line pressure would allow increased flexibility over the acceleration and deceleration response (transient response) of the vehicle.

Previously, there have been various methods to control the line pressure. The most straight forward way is to adjust the spring setting of the line pressure regulator valve in response to the position of the axially positionable input pulley half to alter the level of line pressure in response to the CVT ratio as is described in JP-A 61-105351 or U.S. Pat. No. 4,067,372. The limitation of this system is that there is a single line pressure control over the acceleration where the engine torque is input into the input pulley and declaration where the braking torque is input into the output pulley.

For elongated operating life of the belt, it is desirable to adjust the line pressure to the desired level, which is determined in response to the actual input torque as is described in JP-A 2-62464.

Other prior art CVT control system uses a solenoid actuator to alter the level of line pressure to a higher setting from a lower setting in response to operator brake demand as disclosed on pages C-23 and C-33 of Service Manual of "NISSAN MARCH K11 TYPE SERIES" published in January 1992 by Nissan Motor Co., Ltd. The limitation of this system is that there is no flexibility over the higher setting of line pressure.

Previous line pressure control systems have limited control of line pressure during deceleration initiated by operator brake demand.

SUMMARY OF THE INVENTION

The improved controller means develops various desired line pressure levels in response to operator brake demand. The controller means then develops the control signal in a manner determined as a function of the desired line pressure level. The controller means applies the control signal to line pressure control means to adjust actual line pressure toward the desired line pressure level.

DETAILED DESCRIPTION OF THE INVENTION

Figure 1:
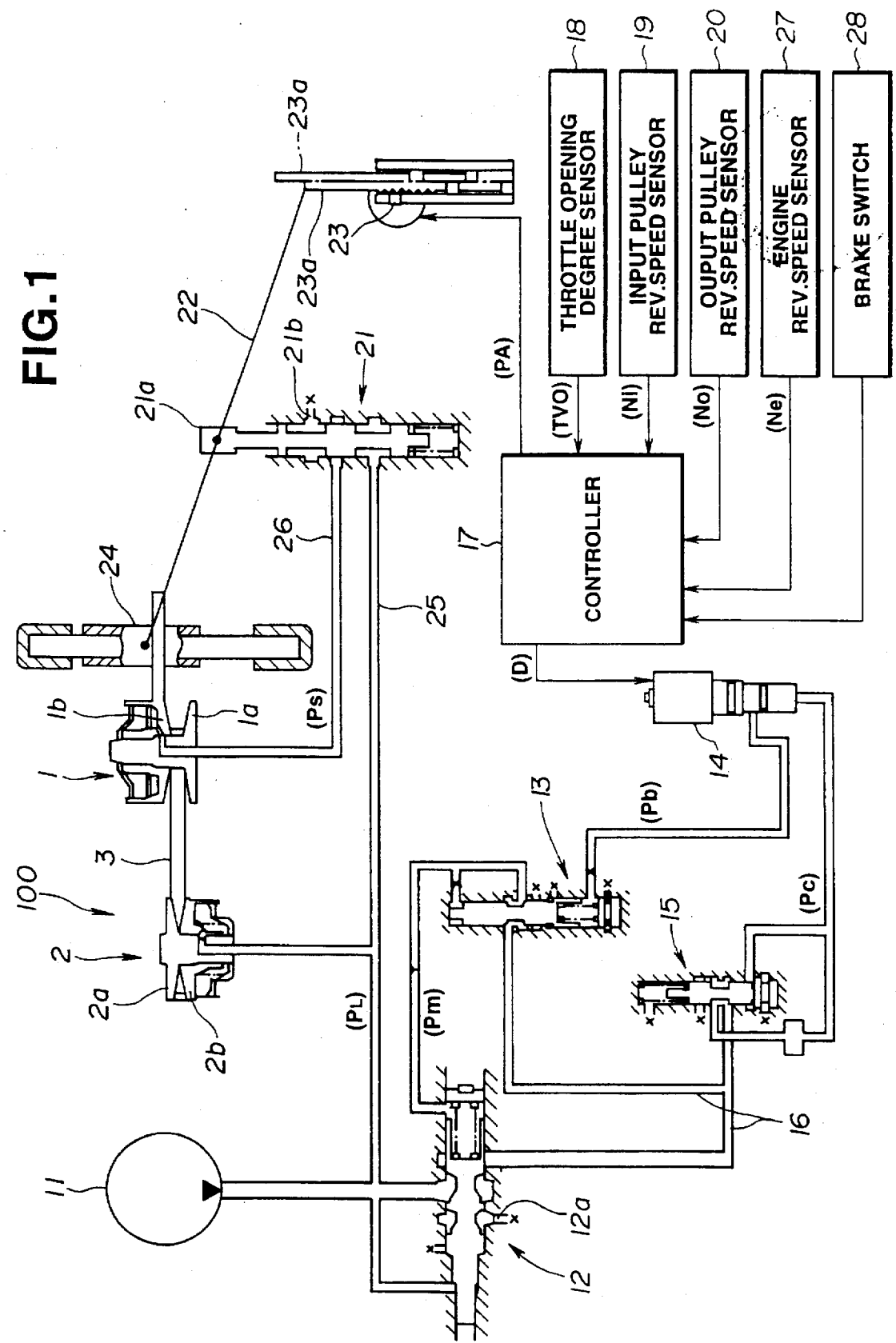
FIG. 1 is a hardware drawing of a control system for a V-belt type continuously variable transmission (CVT)

Referring to FIG. 1, a V-belt type CVT 100 includes an input or driver pulley 1, an output or follower pulley 2, and a power transmission belt in the form of a V-belt 3 drivingly interconnecting the pulleys 1 and 2 for power transer therebetween.

The input pulley 1 includes an axially stationary input pulley half 1a and an axially positionable input pulley half 1b. Similarly, the output pulley 2 includes an axially stationary output pulley half 2a and an axially positionable output pulley half 2b. The axially positionable input pulley half 1b is subject to ratio control hydraulic fluid pressure Ps for movement toward the stationary input pulley half 1a, while the axially positionable output pulley half 2b is subject to line hydraulic fluid pressure PL for movement toward the stationary output pulley half 2a. As ratio control pressure PS is altered relative to line pressure PL, the pulley halves 1b and 2b move, changing the CVT ratio.

For further understanding of the input and output pulleys 1 and 2, reference is made to U.S. Pat. No. 5,067,372 issued on Nov. 26, 1991 in the name of Suzuki and assigned to the common assignee to which the present application is assigned.

Figure 2:
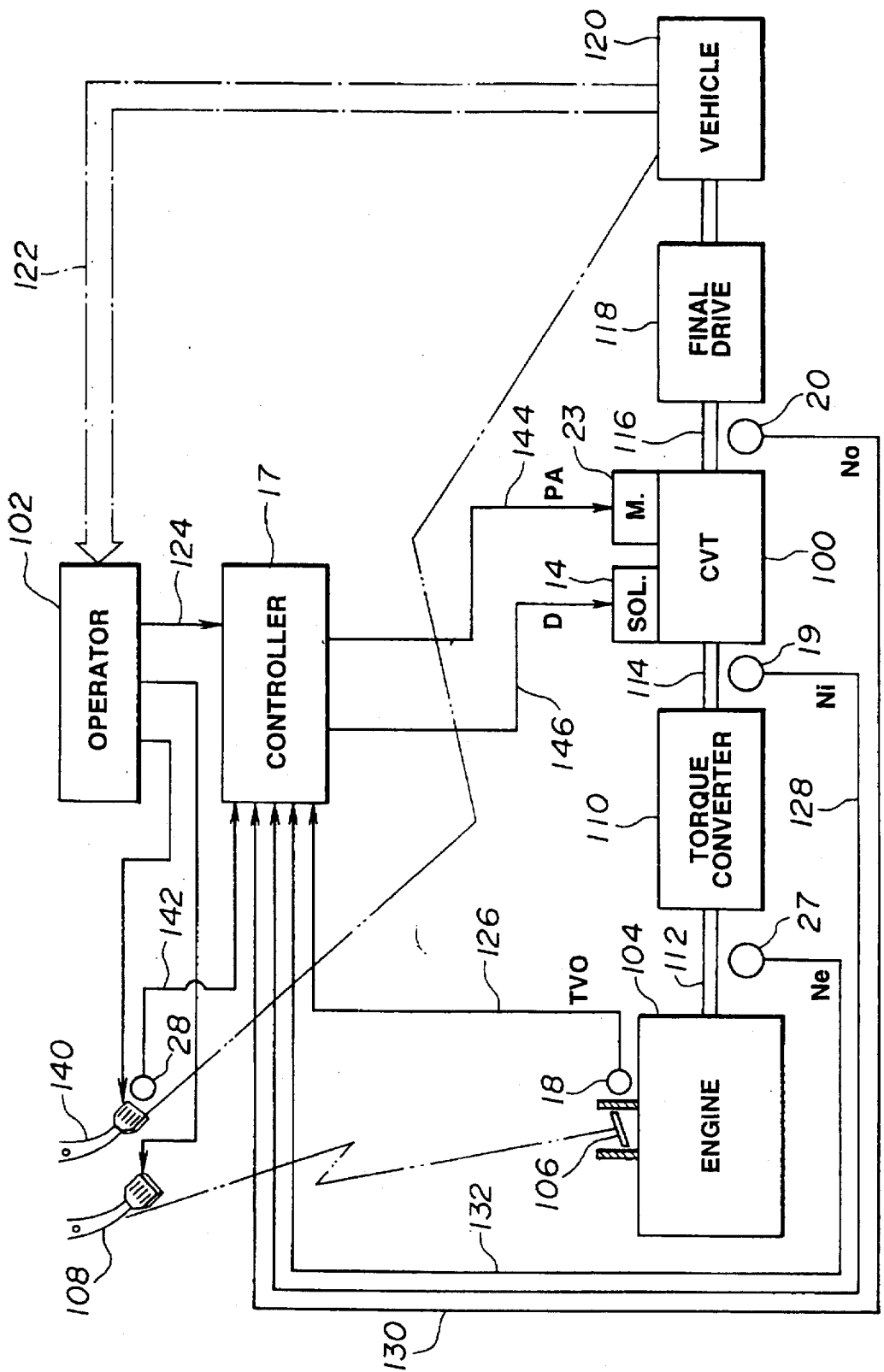
FIG. 2 is a block diagram showing the relationship between the controller, the engine, and the CVT.

Simplified installation of the input and output pulleys 1 and 2 is explained below, Referring to FIG. 2, a box 102 represents the vehicle operator and a box 17 represents the CVT controller. A box 104 represents an engine having various engine speeds. The engine 104 has a throttle 106 that opens in degrees in response to depressed position of a gas pedal 108. The engine 104 is drivingly connected to a hydrokinetic torque transmitting unit in the form of a torque converter 110 althrough the hydrokinetic torque transmitting unit may take the form of a fluid coupling. The torque converter 110 includes, in the known manner, a pump drivingly connected to the engine output shaft 112, a turbine drivingly coupled to a turbine shaft 114 and a stator situated between the pump and the turbine. The turbine shaft 114 is drivingly connectable to the input pulley 1 of the CVT 100. The output pulley 2 of the CVT 100 is drivingly coupled to a pulley output shaft 116. The pulley output shaft 116 is drivingly connected to a final drive 118, which is drivingly connected to the vehicle 120.

The throttle 106 controls the torque output of the engine 104, which outputs its power through the engine output shaft 112. In the torque converter 110, the torque output of the engine 104 is multiplied where there is a difference in speed between the pump and the turbine. The torque converter 110 includes a lock-up clutch in the known manner. The lock-up clutch is engaged in response to a lock-up command signal to bridge the pump and the turbine. With the lock-up clutch engaged, the engine power is transferred to the input pulley 1 of the CVT 100 without any torque multiplication. The CVT 100 transfers the engine power to the final drive 118 which moves the vehicle 120. All of the above components of the engine CVT drivetrain transfer the load of the vehicle 120 back to the engine 104.

The operator 102 perceives the state of the vehicle 120 through normal senses, represented by the feedback line 122. The operator 102 depresses or releases the gas pedal 108 sending a power output demand to the throttle 106. The opening degree of the throttle 106 represents the power output demand. The operator 102 positions a manual selector valve (not shown) to send a shift position signal to the controller 17 through line 142.

The controller 17 senses the state of the engine 104 and the state of the CVT 100 through lines 126, 128, 130 and 132. Line 126 is connected to a throttle opening degree sensor 18 and sends the throttle opening degree signal TVO indicative of a measure of the throttle opening degree to the controller 17. Line 128 is connected to an input pulley revolution speed sensor 19 and sends the input pulley revolution speed signal Ni indicative of a measure of the actual speed of the input pulley 1 to the controller 17. Line 130 is connected to an output pulley revolution speed sensor 20 and sends the output pulley revolution speed signal No indicative of a measure of the actual speed of the output pulley 2 to the controller 17. Line 132 is connected to an engine revolution speed sensor 27 and sends the engine revolution speed signal Ne indicative of a measure of the actual speed of the engine 104 to the controller 17.

The operator 102 perceives the environment and the state of the vehicle 120 and depresses or releases a foot brake pedal 140 sending a brake demand to wheel brakes of the vehicle 120. In this embodiment, the depression of the brake pedal 140 represents the brake demand. The braking torque is transferred to the output pulley 2 of the CVT 100 through the final drive 118 and the puley output shaft 116.

The controller 17 senses the state of the brake pedal 140 through line 142. Line 142 is connected to a brake switch 28 and sends the brake ON signal indicative of depression of the brake pedal 140 to the controller 17. The brake switch 28 is closed in response to depression of the brake pedal 140.

In response to the engine, CVT and brake states, the controller 17 sends a CVT ratio control signal PA through line 144 to a stepping motor 23. The CVT ratio control signal PA on line 144 controls the CVT ratio i (i=Ni/No) between the input pulley revolution speed signal Ni and the output pulley revolution speed signal No. Controlling the CVT ratio controls the input pulley revolution speed Ni and thus the engine speed Ne. The controller 17 sends a line pressure control signal D through line 146 to a solenoid actuator 14.

Referring back to FIG. 1, the ratio control means and line pressure control means are explained.

The line pressure control means include a pressure regulator valve 12, which effects pressure regulation on pressurized hydraulic fluid discharged by a pump 11. The pressure regulator valve 12 receives modifier hydraulic fluid pressure Pm generated by a pressure modifier valve 13. The pressure modifier valve 13 receives duty controlled hydraulic fluid pressure Pb generated by the solenoid actuator 14 in the form of a line pressure solenoid. A pilot valve 15 is provided, which effects pressure regulation on pressurized hydraulic fluid within hydraulic fluid line 16 to generate pilot hydraulic fluid pressure Pc that is always constant. Pilot pressure Pc is supplied to the line pressure solenoid 14. The line pressure solenoid 14 is duty controlled to alter duty pressure Pb in response to the line pressure control signal indicative of duty D that is determined by the controller 17. As duty pressure Pb, is altered, the pressure modifier valve 13 alters modifier pressure Pm and the line pressure regulator valve 12 alters line pressure PL.

Specifically, the pressure regulator valve 12 effects pressure regulation by controlling discharge of hydraulic fluid to the hydraulic fluid line 16 and, if need arises, allowing discharge thereof to a drain port 12a, thus generating line pressure PL in correpondance with modifier pressure Pm. The pilot valve 15 supplies constant pilot pressure Pc to the line pressure solenoid 14. The line pressure solenoid 14 effects pressure regulation on pilot pressure Pc and supplies duty pressure Pb which corresponds to duty D to the modifies valve 13. The modifier valve 13 effects pressure regulation on pressurized hydraulic fluid in the hydraulic line 16 in response to duty pressure Pb to generate modifier pressure Pm, which corresponds to duty pressure Pb and thus to duty D. The modifier pressure Pm is applied to the pressure regulator valve 12, altering line pressure PL, in correspondance with modifier pressure Pm. Thus, controlling duty D results controls line pressure PL.

The above described valvular system for generating line pressure is similar to a well known valvular system described in U.S. Pat. No. 4,680,992 issued to Hayasaki et al. on Jul. 21, 1987 and assigned to the common assignee to which the present application is assigned. Particular attention is to be paid to a regulator valve 20, a modifier valve 22, a line pressure solenoid 24 and a pilot valve 26 shown in FIGS. 1A, 1B and 1C of U.S. Pat. No. 4,680,992.

The ratio control means includes a ratio control valve 21, a shift lever 22 and an input rod 23a positionable by the stepping motor 23. The shift lever 22 has one end connected to a shifter 24 positionable with axial displacement of the input pulley half 1b of the input pulley 1. At the opposite end, the shift lever 22 is connected to the input rod 23a drivingly connected to the stepping motor 23. At a point between the one and opposite ends, the shift lever 22 is pivotably connected to a valve spool 21a of the ratio control valve 21. This arrangement provides position feedback of the input pulley 1 to the valve 21. As the input rod 23a moves the shift lever 22, the ratio control valve 21, in response to movement of the valve spool 21a, alters the hydraulic fluid pressure PS in line 26 connected to the input pulley 1. Line pressure PL is fed to the ratio control valve 21 from the line pressure regulator valve 12 through line 25. As the hydraulic fluid pressure PS is alterted with the hydraulic fluid pressure PL in line 25 unaltered, the input pulley half 1b moves and the V-belt 3 causes the output pulley half 2b to move, changing the ratio of the CVT. As the pulley half 1b moves, the shift lever 22 moves repositioning the valve spool 21a, providing a means for the ratio control valve 21 to stop the positionable input and output pulley halves 1b and 2b from moving.

The ratio control valve 21 uses the hydraulic fluid pressure PL in line 25 in modifying the hydraulic fluid pressure in line 26 by regulating supply of hydraulic fluid to and discharge thereof from line 26 in response to the position to which the valve spool 21a takes. Viewing in FIG. 1, as the valve spool 21a moves upwardly, the supply of hydraulic fluid from line 25 to line 26 increases and discharge of hydraulic fluid from line 26 through a drain port 21b decreases, causing the hydraulic fluid pressure Ps in line 26 to increase. As the valve spool 21a moves downwardly, the supply of hydraulic fluid to line 26 decreases and discharge thereof from line 26 increases, causing the hydraulic fluid pressure PS in line 26 to decrease.

Figure 3:
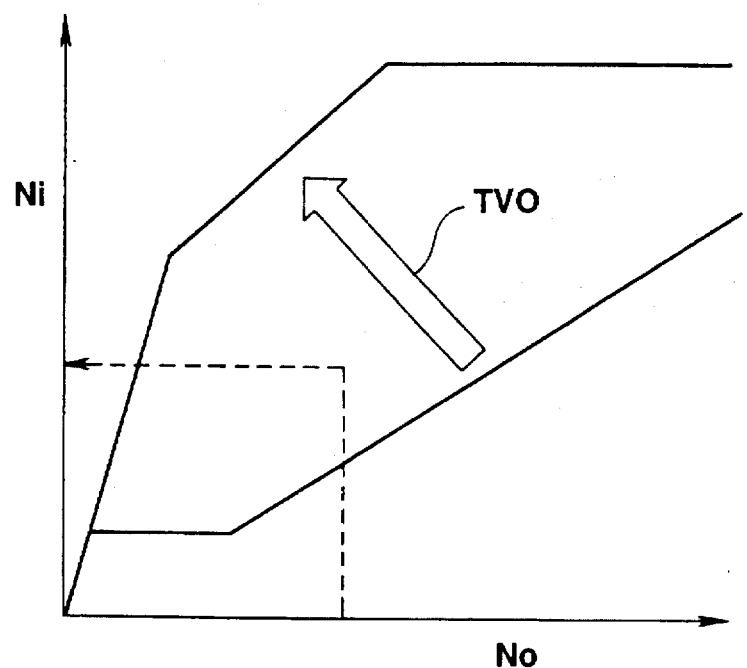
FIG. 3 is a simplified control diagram showing control of the input speed through ratio control.

Controlling the opposite end of the shift lever 22 by the input rod 23a controls the CVT ratio. For ratio control, the controller 17 inputs information of vehicle speed out of output pulley revolution speed signal No and information of throttle opening degree out of throttle opening degree signal TVO, and uses the input information in performing a table look-up operation of a map as illustrated in FIG. 3 to determine a desired value in input pulley revolution speed Ni. The controller 17 outputs the ratio control signal in the form of number of steps PA of the stepping motor 23 to turn the stepping motor 23 until the desired value in the input pulley revolution speed Ni is accomplished. Let us assume that the stepping motor 23 turns in one direction to cause the input rod 23a to move the shift lever 22. As the input rod 23a moves the shift lever 22, the ratio control valve 21 in response to the movement of the valve spool 21a alters the hydraulic fluid pressure PS applied to the input pulley 1 with the hydraulic fluid pressure PL applied to the output pulley 2 unaltered. As the pressure PS applied to the input pulley 1 is altered, the input and output pulley halves 1b and 2b move, changing the CVT ratio to a ratio corresponding to the angular position taken by the stepping motor 23. As the input pulley half 1b moves, the shift lever 22 moves repositioning the valve spool 21a of the ratio control valve 21.

Figure 5:
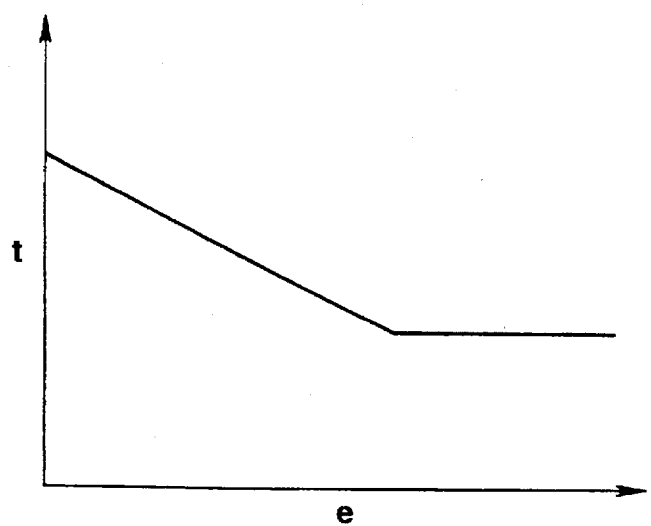
FIG. 5 is a torque multiplication vs. speed ratio characteristic of the torque converter.
Figure 4:
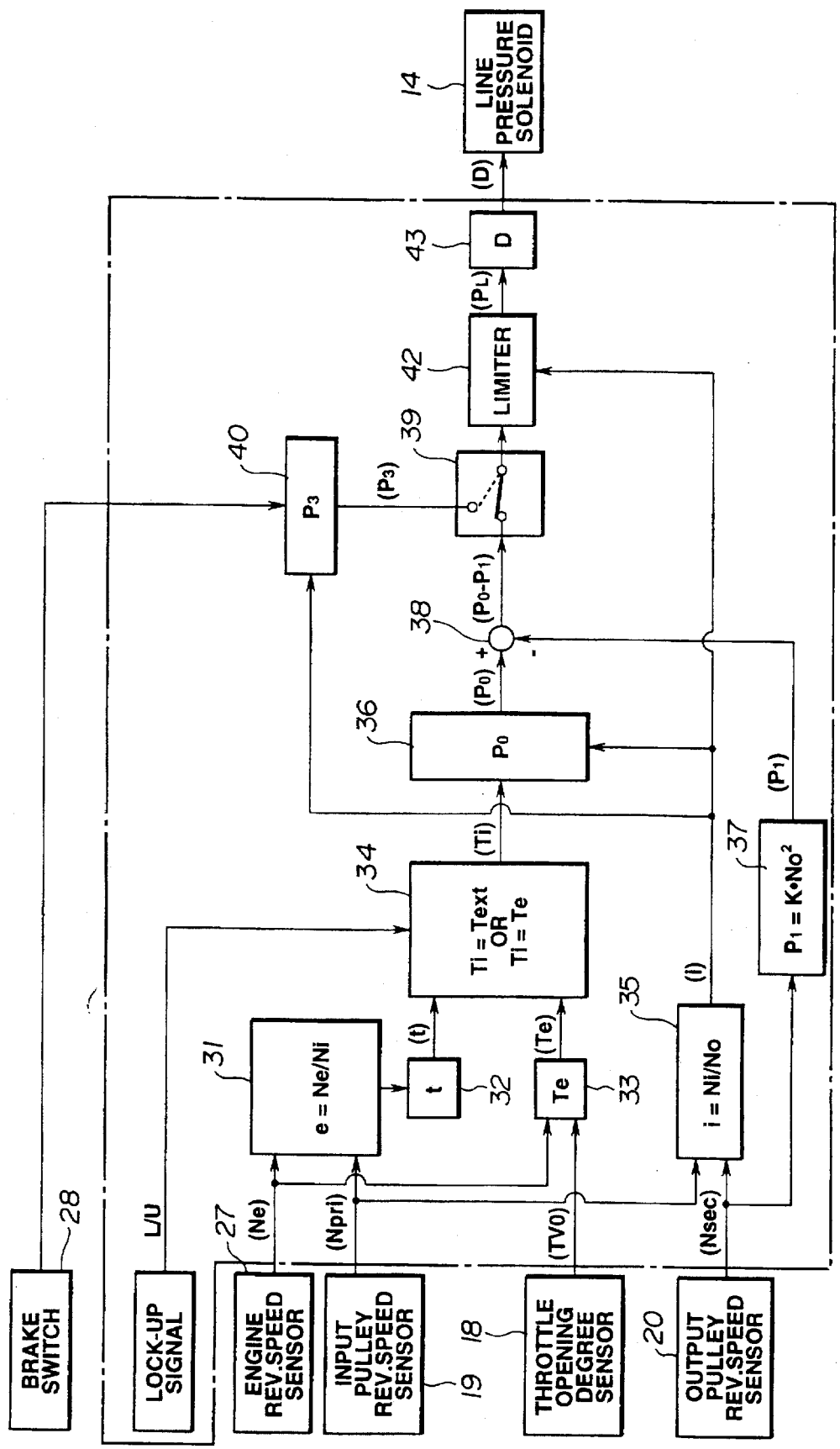
FIG. 4 is a control diagram showing control of line pressure.

A preferred implementation of the present invention can be understood with reference to the control diagrams in FIG. 4. In other words, the controller 17 may be constructed to perform operation as illustrated in FIG. 4. Engine revolution speed signal Ne and input pulley revolution speed signal Ni are used as the input to a torque converter speed ratio generator 31. The generator 31 determines a ratio e between the engine revolution speed Ne and the input pulley revolution speed Ni. The generator 31 outputs a torque converter speed ratio signal indicative of the determined ratio e. The torque converter speed ratio signal e is used as the input to a torque multiplication ratio generator 32. The torque multiplication ratio generator 32 may be a look-up table in the controller memory containing data in torque multiplication ratio of the torque converter 110 versus data in torque converter speed ratio as illustrated in FIG. 5. The torque multiplication ratio generator 32 determines a torque multiplication ratio t of the torque converter 110 by performing a table look-up operation of FIG. 5 against the torque converter speed ratio e. The torque multiplication ratio generator 32 outputs a torque multiplication ratio signal indicative of the determined torque multiplication ratio t.

Figure 6:
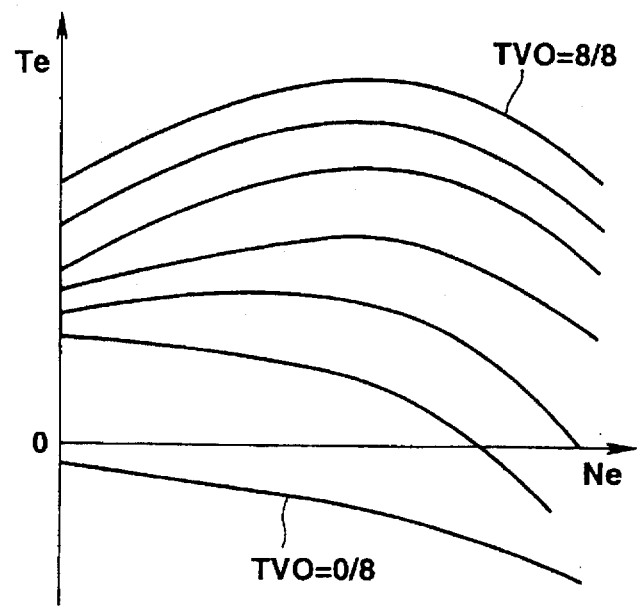
FIG. 6 shows a family of engine torque vs. speed characteristic curves of the engine against various throttle opening degrees.

Engine revolution speed signal Ne and throttle opening degree signal TVO are used as the input to an engine torque generator 33. The engine torque generator 33 may be a look-up table in the controller memory containing data in output torque of the engine 104 against data in engine revolution speed for various throttle opening degrees as illustrated in FIG. 6, which shows the performance of the engine 104. The engine torque generator 33 determines engine torque Te by performing a table look-up operation of FIG. 6 using engine revolution speed Ne and throttle opening degree TVO. The engine torque generator 33 outputs an engine torque signal indicative of the determined engine torque Te.

In response to the presence of a lock-up signal L/U, the torque converter 110 locks up owing to engagement of the lock-up clutch thereof. This lock-up signal L/U is input into an input torque generator 34. Torque multiplication ratio signal t and engine torque signal Te are used as the input to the input torque generator 34. The input torque generator 34 determines input torque Ti by calculating Ti=Te×t in response to the absence of the lock-up signal L/U or Ti=Te in response to the presence of the lock-up signal L/U. The input torque generator 34 outputs an input torque signal indicative of the determined input torque Ti.

Figure 7:
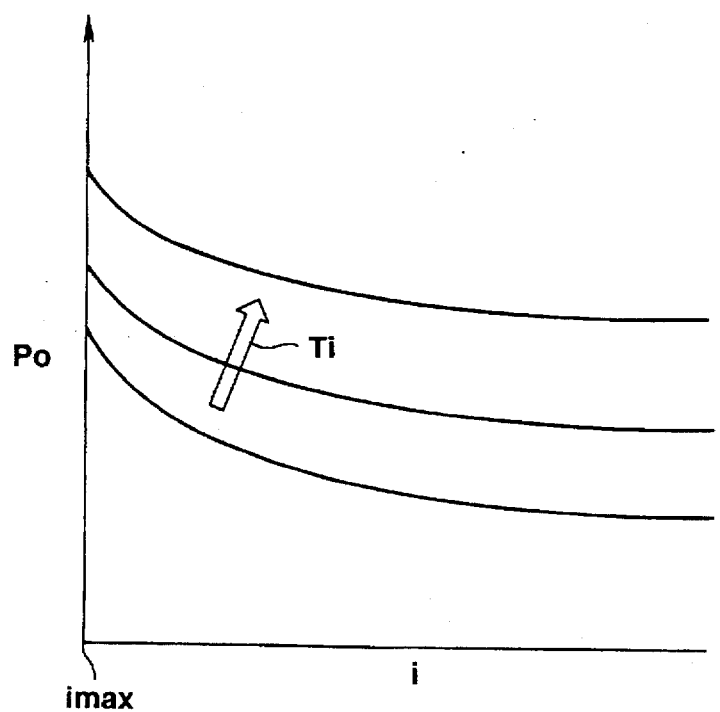
FIG. 7 shows various data of desired line pressure, applied to the output pulley to create force required for the output pulley to hold a power transmission belt between the axially positionable and stationary pulley halves thereof, against various CVT ratios for different input torque to the input pulley.

Input pulley revolution speed signal Ni and output pulley revolution speed signal No are used as the input to a CVT ratio generator 35. The CVT ratio generator 35 determines a CVT ratio i between the input and output pulley revolution speeds Ni and No. The CVT ratio generator 35 generates a CVT ratio signal indicative of the determined CVT ratio i. Input torque signal Ti and CVT ratio signal i are used as the input to a line pressure generator 36. The line pressure generator 36 may be a look-up table in the controller memory containing data P0 of desired line pressure versus data in CVT ratio i for various input torque Ti as illustrated in FIG. 7. Data P0 of desired line pressure represent line pressure levels required for the output pulley 2 to hold the V-belt 3 between the output pulley halves 1a and 1b. The line pressure regulator 36 determines appropriate one of data of desired line level by performing a table look-up operation of FIG. 7 using input torque Ti and CVT ratio i. The line pressure regulator 36 outputs a line pressure signal indicative of the determined data of dersired line pressure level P0.

Output pulley revolution speed signal indicative of output pulley revolution speed No is used as the input to a centrifugal force dependent pressure generator 37. The centrifugal force dependent pressure generator 37 determines a centrifugal force dependent pressure P1 by calculating $P_1 = K \times No^2$, where K is a constant. The centrifugal force dependent pressure generator 37 outputs a centrifugal force dependent pressure signal indicative of the determined centrifugal force dependent pressure P1. The line pressure signal P0 and centrifugal force dependent pressure signal P1 are used as the input to a summation point 38. The summation point 38 subtracts the centrifugal force dependent pressure signal P1 from the line pressure signal P0. The summation point 38 outputs a signal indicative of the subtraction P0–P1.

Figure 8:
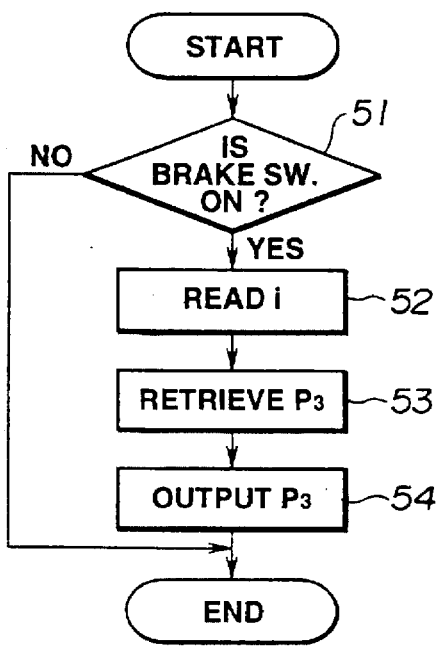
FIG. 8 is a flow chart of a control routine.

The CVT ratio signal i and output of the brake switch 28 are used as the input to a line pressure determination loop 40. The line pressure determination loop 40 determines a data of desired line pressure P3 required during braking operation by executing a control routine as illustrated by the flow diagram of FIG. 8. In FIG. 8, at a block 51, the controller 17 determines whether the brake switch 28 is turned ON or not. If the brake switch 28 is not turned ON, the controller 17 goes to an end point of the routine. If the brake switch 28 is turned ON, the controller 17 reads the CVT ratio i at a block 52. At the next block 53, the controller 17 uses the CVT ratio i in performing a table look-up operation of FIG. 9 to retrieve the data of desired line pressure P3. At a block 54, the controller 17 outputs a line pressure signal indicative of the determined data of desired line pressure level P3.

Figure 9:
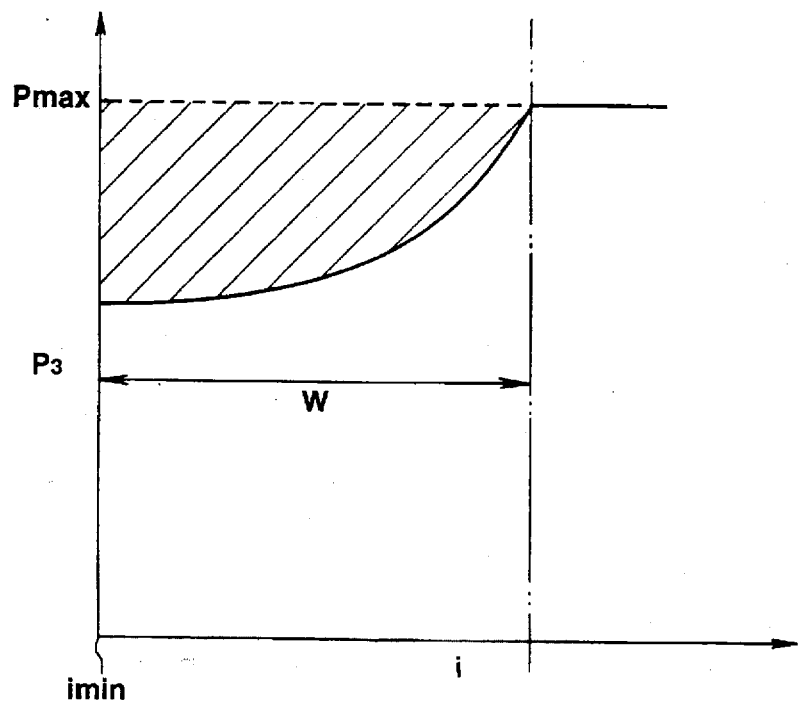
FIG. 9 shows various data of desired line pressure, applied to the output pulley during braking to create force required for the output pulley to hold the power transmission belt between the axially positionable and stationary pulley halves thereof, against various CVT ratios.

The controller 17 stores data as illustrated in FIG. 9. FIG. 9 shows stored data of desired line pressure level P3 against various CVT ratios over the whole CVT ratios including and limited by the largest CVT ratio and the smallest CVT ratio imin. In FIG. 9, Pmax represents the maximum level of line pressure, and the character W represents a window including the smallest CVT ratio imin. The setting of data of desired line pressure level P3, is such that it provides a line pressure high enough to cause the output pulley 2 to create force to hold the V belt 3 without any slip. Specifically, there are different data of desired line pressure level P3 against different CVT ratios i falling in the window W. Against different CVT ratios i falling in the window W, the data of the desired line pressure level P3 decreases from the maximum level Pmax as the CVT ratio i decreases toward the smallest CVT ratio imin. In other words, data of desired line pressure level P3 at the largest CVT ratio imax provides the maximum level of line pressure Pmax, and the different data of desired line pressure level against different CVT ratios i falling in the window W are lower than the data of desired line pressure level at the largest CVT ratio imax. Thus, as the CVT ratio i approaches the largest CVT ratio imax, desired line pressure level P3 approaches the maximum level PMAX of line pressure, while as the CVT ratio i approaches the smallest CVT ratio imin, the desired line pressure level P3 drops from the maximum level Pmax of line pressure.

The signal indicative of the subtraction P0−P1 and the output of the line pressure determination loop 40 are used as the input to a line pressure selector 39. Since the line pressure determination loop 40 does not provide any output when the brake switch 28 is not turned ON, the line pressure selector 39 outputs the subtraction P0−P1. In response to the presence of the output of the line pressure determination loop 40, the line pressure selector 39 outputs the determined data of desired line pressure level P3.

Figure 10:
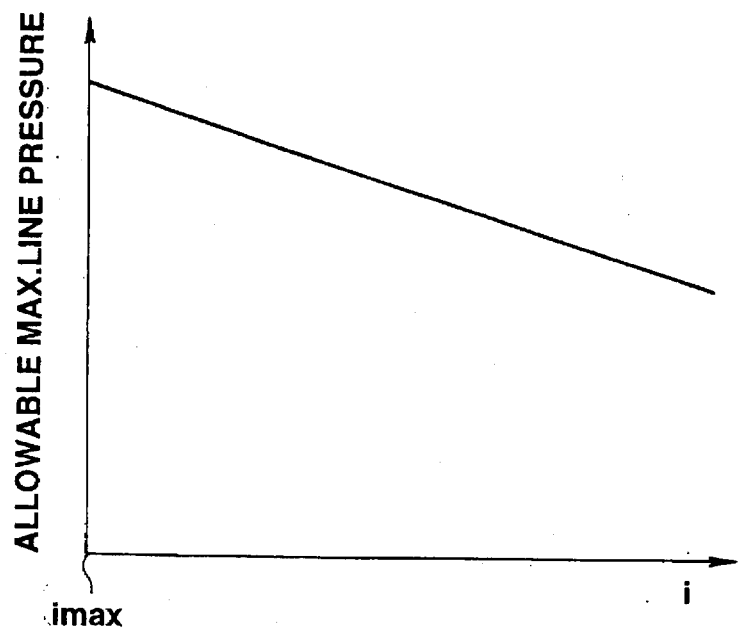
FIG. 10 shows variation of allowable maximum line pressure against various CVT ratios.

The CVT ratio signal i and the output of the line pressure selector 39 are used as the input of a limiter 42. As illustrated in FIG. 10, the limiter 42 provides allowable maximum line pressure level, which varies as the CVT ratio varies and cuts off the magnitude of pressure above the allowable maximum line pressure level. The limiter 42 outputs a desired line pressure signal PL indicative of the pressure having past therethrough.

Figure 11:
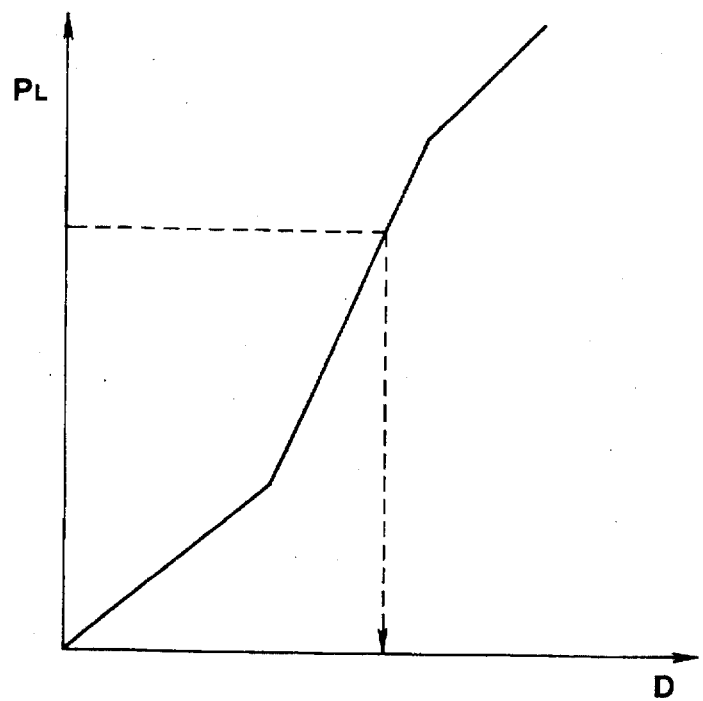
FIG. 11 shows the relationship between desired line pressure and duty ratio.

The desired line pressure signal PL is used as the input to a line pressure solenoid duty generator 43. The line pressure solenoid duty generator 43 may be a look-up table in the controller memory containing data of duty D against data of desired line pressure PL as illustrated in FIG. 11. The line pressure solenoid duty generator 43 determines duty D corresponding to the desired line pressure signal PL by performing a table look-up operation of FIG. 10. The line pressure duty solenoid generator 43 outputs a duty signal indicative of the determined duty D. The line pressure solenoid 14 is operable to regulate constant pressure Pc from the pilot valve 15 to generate duty pressure Pb responsive to the determined duty D. The duty pressure Pb is applied to the modifier valve 13. The modifier valve 13 generates modifier pressure Pm responsive to the determined duty D. The modifier pressure Pm is applied to the pressure regulator valve 12. The pressure regulator valve 12 regulates pressurized fluid from the pump 11 to generate line pressure PL responsive to the determined duty D. Thus, the line pressure PL generated by the line pressure regulator valve 12 corresponds to the desired line pressure determined by the controller 17.

During braking operation, the line pressure PL generated by the line pressure regulator valve 12 is increased to a level as high as the line pressure level P3 that is set higher than the normal line pressure level P0−P1 that corresponds to the derived input torque to the CVT 100. This prevents slip of the V-belt 3 during braking operation, resulting in elongated operating life of the V-belt 3.

With the line pressure level P3 determined as discussed previously, there occurs no excessively strong tension of the V-belt 3 without causing any slip of the V-belt 3 during braking operation, resulting in improved endurability of the V-belt 3.

What is claimed is:

1. A CVT control system for a vehicle drivetrain, comprising:
   a CVT having an input pulley and an output pulley drivingly connected to the input pulley by a power transmission belt, each of the input and output pulleys having an axially positionable pulley half and an axially stationary pulley half;
   a ratio control unit operable to establish various positions of the axially positionable pulley half of the input pulley relative to the axially stationary pulley half of the input pulley to establish various CVT ratios between the input pulley and the output pulley;
   a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley; and
   a controller for developing the control signal in response to an operator brake demand for deceleration of the output pulley, wherein the controller:
      develops various desired line pressure levels in response to the presence of the operator brake demand,
      develops the control signal in a manner determined as a function of the desired line pressure levels, and
      applies the control signal to the line pressure control to adjust an actual line pressure toward the desired line pressure level.

2. A CVT control system as claimed in claim 1, wherein the controller stores different data of the desired line pressure level against different CVT ratios within an available range of CVT ratios.

3. A CVT control system as claimed in claim 1, wherein the controller stores data of the desired line pressure level, which decreases as the CVT ratio decreases toward a smallest CVT ratio of an available range of different CVT ratios.

4. A CVT control system as claimed in claim 2, wherein the controller stores data of the desired line pressure level at the largest CVT ratio and the different data of the desired line pressure levels at different CVT ratios are lower than the data of the desired line pressure level at the largest CVT ratio.

5. A CVT control system as claimed in claim 4, wherein the desired line pressure levels are determined so as to adjust the magnitude of force required to hold the power transmission belt to the required minimum over the available range of the CVT ratios.

6. A CVT control system for a vehicle drivetrain, comprising:
   a CVT having an input pulley and an output pulley drivingly connected to the input pulley by a power transmission belt, each of the input and output pulleys having an axially positionable pulley half and an axially stationary pulley half;
   a ratio control unit operable to establish various positions of the axially positionable pulley half of the input pulley relative to the axially stationary pulley half of the input pulley to establish various CVT ratios between the input pulley and the output pulley;
   a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley; and a controller for developing the control signal in response to an operator brake demand for deceleration of the output pulley, wherein the controller:

derives an actual CVT ratio between the input and output pulleys based on actual speeds of the input pulley and the output pulley, develops a desired line pressure level for the actual CVT ratio in response to the operator brake demand, develops the control signal in a manner determined as a function of the desired line pressure level, and applies the control signal to the line pressure control unit to adjust an actual line pressure toward the desired line pressure level.

7. A control method for a vehicle drivetrain having a CVT having an input pulley and an output pulley drivingly connected to the input pulley by a power transmission belt, each of the input and output pulleys having an axially positionable pulley half and an axially stationary pulley half, a ratio control unit operable to establish various positions of the axially positionable pulley half of the input pulley relative to the axially stationary pulley half of the input pulley to establish various CVT ratios between the input pulley and the output pulley, a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley, and a controller for developing the control signal in the presence of an operator brake demand for deceleration of the output pulley, the control method comprising the steps of:

developing various desired line pressure levels in the presence of the operator brake demand;

generating the control signal in a manner determined as a function of the desired line pressure level; and applying the control signal to the line pressure control unit to adjust an actual line pressure toward the desired line pressure level.

8. A control method for a vehicle drivetrain including a CVT having an input pulley and an output pulley drivingly connected to the input pulley by a power transmission belt, each of the input and output pulleys having an axially positionable pulley half and an axially stationary pulley half, a ratio control unit operable to establish various positions of the axially positionable pulley half of the input pulley relative to the axially stationary pulley half of the input pulley to establish various CVT ratios between the input pulley and the output pulley, a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley, and a controller for developing the control signal in response to an operator brake demand for deceleration of the output pulley, the control method comprising the steps of:

deriving an actual CVT ratio between the input and output pulleys based on actual speeds of the input pulley and the output pulley;

developing a desired line pressure level for the actual CVT ratio in response to the operator brake demand;

developing the control signal in a manner determined as a function of the desired line pressure level; and applying the control signal to the line pressure control unit to adjust an actual line pressure toward the desired line pressure level.

9. A vehicle drivetrain control system, comprising:

an engine having a positional throttle;

a hydraulic torque converter;

a CVT having an input pulley and an output pulley drivingly connected to the input pulley by a power transmission belt, each of the input and output pulleys having an axially positionable pulley half and an axially stationary pulley half;

a ratio control unit operable to establish various positions of the axially positionable pulley half of the input pulley relative to the axially stationary pulley half of the input pulley to establish various CVT ratios between the input pulley and the output pulley;

a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley; and a controller for developing the control signal in response to an operator brake demand for deceleration of the output pulley, wherein the controller:

derives an actual engine torque based on an actual engine speed and an actual throttle position, derives an actual torque multiplication ratio provided by the torque converter based on a torque converter ratio, which is based on the actual engine speed and an actual speed of the input pulley, derives an actual input torque applied to the input pulley based on the derived actual torque ratio and the derived engine torque, derives an actual CVT ratio based on the actual speed of the input pulley and an actual speed of the output pulley, develops a desired line pressure level based on the derived actual CVT ratio and the derived input torque in the absence of the operator brake demand and a different desired line pressure level based on the derived input torque in the presence of the operator brake demand, and develops the control signal in a manner determined as a function of the desired line pressure level in the absence of the operator brake demand.

10. A CVT control system for a vehicle drivetrain, comprising:

a CVT having an input pulley and an output pulley drivingly connected to the input pulley by a power transmission belt, each of the input and output pulleys having an axially positionable pulley half and an axially stationary pulley half;

a ratio control unit operable to establish various positions of the axially positionable pulley half of the input pulley relative to the axially stationary pulley half of the input pulley to establish various CVT ratios between the input pulley and the output pulley;

a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley; and a controller for developing the control signal in response to an operator brake demand for deceleration of the output pulley, wherein the controller:

develops various first desired line pressure levels in the absence of the operator brake demand, develops various second desired line pressure levels, which are different from the various first desired line pressure levels, in the presence of the operator brake demand, develops the control signal in a manner determined as a function of the second desired line pressure level in the presence of the operator brake demand, and applies the control signal to the line pressure control unit to adjust an actual line pressure toward the second desired line pressure level.

11. A CVT control system for a vehicle drivetrain, comprising:

a CVT having an input pulley and an output pulley drivingly connected to the input pulley by a power transmission belt, each of the input and output pulleys having an axially positionable pulley half and an axially stationary pulley half;

a ratio control unit operable to establish various positions of the axially positionable pulley half of the input pulley relative to the axially stationary pulley half of the input pulley to establish various CVT ratios between the input pulley and the output pulley;

a line pressure control unit having an actuator operable in response to a control signal to establish various line pressure levels applied to the output pulley to create force required for the output pulley to hold the power transmission belt between the axially positionable pulley half of the output pulley and the axially stationary pulley half of the output pulley; and a controller for developing the control signal, wherein the controller:

develops various first desired line pressure levels based on operative conditions of the vehicle in the absence of an operator brake demand, develops various second desired line pressure levels based on the CVT ratios prevailing at the time when the operator brake demand is present, which levels are different from the various first desired line pressure levels, develops the control signal in a manner determined as a function of the second desired line pressure level in the presence of the operator brake demand, and applies the control signal to the line pressure control unit to adjust actual line pressure toward the desired line pressure level.

12. A CVT control system as claimed in claim 11, wherein the second desired line pressure levels are related to the CVT ratios such that the higher the CVT ratio, the higher the second desired line pressure.

* * * * *